March 26, 1968 M. ALDEN 3,375,406

ELECTRICAL HARNESS

Filed Jan. 7, 1966

MILTON ALDEN
INVENTOR.

BY [signature]

United States Patent Office 3,375,406
Patented Mar. 26, 1968

3,375,406
ELECTRICAL HARNESS

Milton Alden, Needham, Mass., assignor to Alden Research Foundation, Westboro, Mass., a corporation of Massachusetts Filed Jan. 7, 1966, Ser. No. 519,221
9 Claims. (Cl. 317—99)

ABSTRACT OF THE DISCLOSURE

This invention relates to an electrical harness and, more particularly, to apparatus for carrying, segregating, and identifying wiring in a multi-level electrical cabinet.

Figure 1:
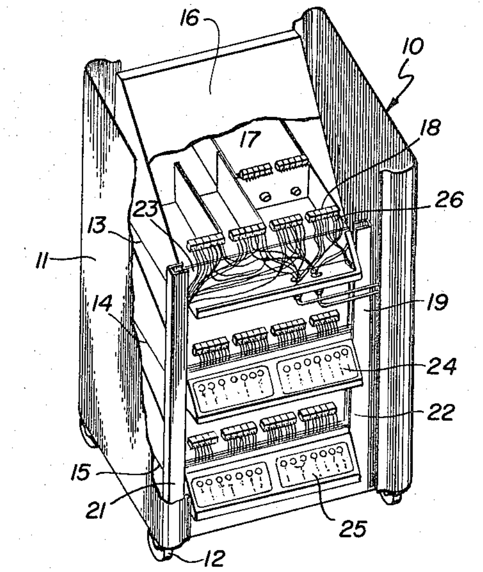

It is common practice to arrange various pieces of electronic equipment on shelves in a single cabinet, each chassis providing for a single function in a complex electronic apparatus. Each chassis is arranged in the cabinet with its control knobs at the front side of the cabinet and its external electrical connections at the back side of the cabinet. Then, it is common practice to provide a harness of wires for inter connecting the various chassis. The manufacture of such a harness is a time-consuming project, requiring skilled help. In order to give a neat appearance and compact arrangement to the harness, it is necessary that each wire extending from one chassis to another be cut to an exact length. Furthermore, after such a chassis has been constructed, it is difficult to service the apparatus from the back side because the various wires in the harness must necessarily be bunched together and tied. This not only makes it difficult to replace individual wires but also makes it difficult to trace the wiring to correct a malfunction in the overall electronic apparatus. These and other difficulties experienced with the prior art devices have been obviated in a novel manner by the present invention.

It is, therefore, an outstanding object of the invention to provide an electrical apparatus providing for ease of connection of various electronic chassis contained in a cabinet.

Another object of this invention is the provision of an electrical apparatus for producing an inter-chassis connecting system for a multi-chassis cabinet.

A further object of the present invention is the provision of an electrical apparatus providing a harness for interconnecting a plurality of electrical elements in which the length of the individual wires is not critical and yet in which a neat apparance is maintained.

It is another object of the instant invention to provide an electrical apparatus consisting of a harness in which the individual wires are held together in a group and, yet, in which individual wires may be readily removed without removing cabling ties and the like.

It is a further object of the invention to provide an electrical apparatus for connecting a plurality of chassis in which shielding and protection from contamination is automatically provided.

A still further object of this invention is the provision of an electrical apparatus providing for automatic organization of complex wiring for making fast simple connections by use of unskilled workers.

It is still a further object of the present invention to provide an electrical apparatus for interconnecting a plurality of chassis in which wiring time is substantially reduced, in which the rigging may be performed by unskilled workers, in which rejections are reduced to a minimum, and in which replacement or repair of inter-chassis wiring is greatly simplified.

It is another object of the invention to provide an electrical apparatus for connecting electrical units which is particularly adaptable to the embedding of wires in plastic.

Another object of the invention is the provision of electrical apparatus which may be replaced in any part of the world by unskilled labor, without problems due to language differences.

With these and other objects in view, as will be apparent to those skilled in the art, the invention resides in the combination of parts set forth in the specification and covered by the claims appended hereto.

Figure 2:
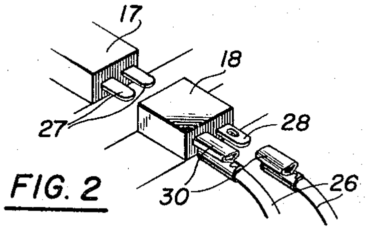
Figure 3:
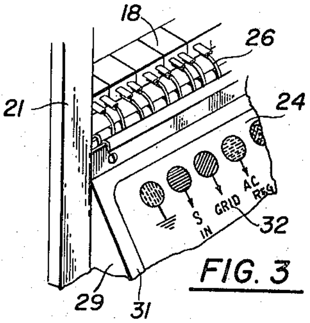
Figure 4:
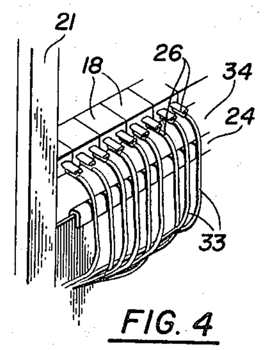
Figure 5:
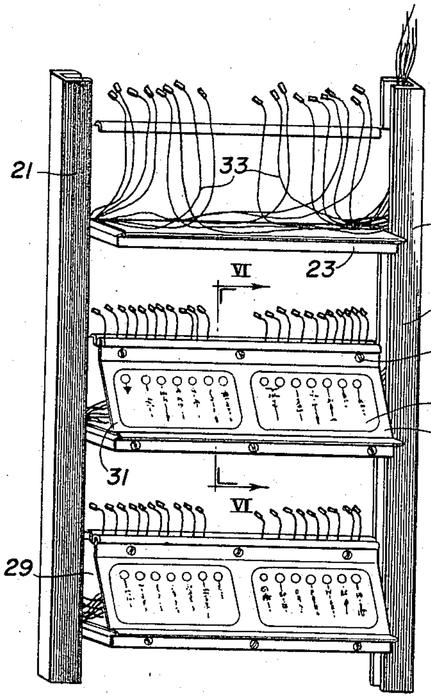
Figure 6:
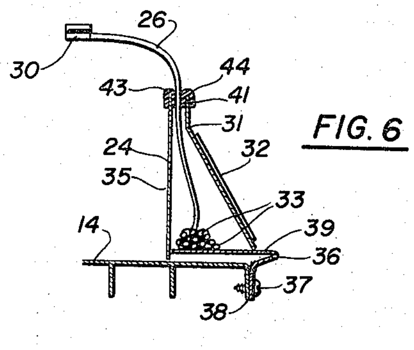

The character of the invention, however, may be best understood by reference to one of its structural forms, as illustrated by the accompanying drawings in which:

FIG. 1 is a perspective view of electrical apparatus embodying the principles of the present invention, FIG. 2 is a close-up view of certain electrical connections, FIG. 3 is an enlarged view of a portion of the apparatus, particularly showing certain indicia, FIG. 4 is an enlarged view of a portion of the apparatus, particularly showing electrical connections, FIG. 5 is a perspective view of a harness, and FIG. 6 is a sectional view of the apparatus taken on the line VI—VI of FIG. 5.

Referring first to FIG. 1, wherein are best shown the general features of the invention, the electrical apparatus, indicated generally by the reference numeral 10, is shown as consisting of a cabinet 11 mounted on casters 12 and having a plurality of horizontal, spaced, parallel shelves 13, 14, and 15. Each shelf carries a plurality of electronic chassis, such as the chassis 16 mounted on the shelf 13, each chassis having a plurality of electrical connections 17 mounted at its back end. Arranged along the back end of each shelf is a row of fixed intermediate connectors 18 adapted to receive (on the sides facing the chassis) the connectors 17. At the rear of the cabinet 11 and arranged vertically behind the shelves 13, 14, and 15 is a harness 19 consisting of a channel 21 and a channel 22 arranged vertically and in spaced parallel relationship along the sides of the cabinet 11; the channels are joined by three cross-pieces 23, 24, and 25, each arranged at the horizontal level of the shelves 13, 14, and 15, respectively. Extending laterally from each of the cross-pieces are the ends 26 of a plurality of wires, these ends adapted to be connected to the back side of the connectors 18.

FIG. 2 shows the manner in which the electrical connections 17, the fixed connectors 18, and the ends 26 of the wires are connected together. The electrical connections 17 are provided with male blades 27 which fit into sockets formed in the surfaces of the connectors 18 facing forwardly of the cabinet. Extending rearwardly of the connectors 18 are blades 28 and over these blades are fitted female connectors 30 which are soldered to the free ends 26 of the wires.

Referring to FIG. 3, it can be seen that the cross-piece 24, which is typical of the cross-pieces, is in the form of a hollow conduit having an open end 29 facing toward the open side of the channel 21. This figure of the drawings shows the manner in which the ends 26 of the wires extend from the cross-piece and are fastened to the connectors 18 which, in turn, are connected to each of the chassis, of which the chassis 16 is an example. Forming part of the cross-piece is an access door 31 carrying indicia 32 indicative of the nature of the wires whose ends 26 extend outwardly of the cross-piece 24.

FIG. 4 shows the cross-piece 24 with the access door 31 removed and the wires 33 passing vertically over the edge of the cross-piece 24.

The details of the harness 19 are shown in FIG. 5. The channels 21 and 22 are of C-shaped cross-section with the open sides facing inwardly. For instance, the open side of the channel 21 faces toward the open end 29 of the cross-piece 24. Not only do the wires 33 extend through the channels 21 and 22 and through the cross-pieces 23, 24, and 25, but some of them may also extend, as in the case of wires 33, from the end of one of the channels for attachment to an external source.

FIG. 6 shows the relationship of the cross-piece 24 to the back edge of the shelf 14. The cross-piece 24 is formed as a conduit of generally triangular cross-section. It is made up of a plate 35 which extends between the channels 21 and 22 and is in the same general vertical plane, a shelf 36 is fastened by screws 37 to a flange 38 at the back edge of the shelf 14 and has a horizontal upper surface 39, and the access door 31 whose lower edge rests on the surface 39 and whose upper edge lies adjacent the upper edge of the plate 35. The access door 31 has its major lower portion inclined at a substantial angle to the vertical and to the plane of the plate 35, so that the indicia 32 may be readily observed by a person standing at the back of the cabinet 11. Adjacent its upper edge the access door 31 is bent to provide a flat edge portion 41 which is parallel to the plate 35 and which is attached to it by screws 42 (see FIG. 5). Overlying the upper edge of the plate 24 is an elastomer element 43 which is bent over the edge and cemented in place. A similar elastomer element 44 extends over the upper edge of the access door 31 (that is to say, over the portion 41) and is also cemented in place. The ends 26 of the wires 33 extend between the two elastomer elements 43 and 44 and, of course, are provided with connectors 30. As can be seen in FIG. 6, the wires 33 contained in the cross-piece 24 lie on the surface 39 of the shelf 36 and are retained in a compact group between the plate 35 and the access door 31. The bottom edge of the access door 31 is free, because of the fact that the access door is attached to the rest of the cross-piece 24 only by the screws 42 at the upper edge, the lower edge of the access door swinging relatively freely and resting on the surface 39. This allows it to regulate its position somewhat in accordance with the number of wires 33.

The operation of the electrical apparatus will now be readily understood, in view of the above description. With the apparatus 10 in operation and the wires 35 connected to external sources, all of the chassis (similar to the chassis 16) are rendered operative and are connected together by the wires 33 contained in the harness 19. Power and external signals enter the system through the wires 35 at the top of the channel 22 and are distributed through the wires 33 lying in the channels 21 and 22 and in the cross-pieces 23, 24, and 25. An individual chassis 16 is rendered operative by being pushed rearwardly on its shelf 13 until the blades 27 of the electrical connection 17 are engaged in the sockets of the connectors 18 at the rear of the shelf. Furthermore, the harness 19 is put in place and held by the screws 37 engaging the flanges 38 at the rear of the shelves, as is shown in FIG. 6. With the frame of the harness in place, the ends 26 are then connected to suitable portions of the connectors 18 by placing the connectors 30 over the blades 28 and soldering them in place. This work is done with the access door 31 removed in the manner shown in FIG. 4, the indicia 32 on each of the access doors 31 indicating the manner in which the wires in the particular cross-piece or conduit is connected to the connectors 18 and, therefore, to a chassis. Once the connections have been made, the access door 31 is replaced, the screws 42 inserted and turned slightly, and the screws are then slowly tightened. The wires 26 are locked and held resiliently between the elastomer elements 43 and 44. Before the last tightening turn is made on the screws 42, the egress position of each of the ends 26 is adjusted to give a neat appearance to the harness. The electrical apparatus 10 is then ready to operate.

It can be seen that the present electrical apparatus provides an inter-chassis connecting system which eliminates the high cost and inaccessibility of the old system of laced cables. The wiring channel system neatly encloses all inter-connecting leads to provide shielding and protection from contamination. Color-coded leads with contacts on each end for push-fit connections to the back connector tabs can be stocked in standard, non-critical lengths. The locating and clamping pads automatically organize all of the wiring for fast simple connections by unskilled workers. Furthermore, all the pertinent circuit function and test data is made clear to the repairman or operator by pictures exactly at the point of check for each input or output interconnecion. This is accomplished by a display of words, numbers, symbols, and color-coding to make it practical for personnel anywhere in the world with minimum training to trace, test and repair malfunctions. This inter-chassis connecting system cuts wiring time appreciably and eliminates the use of expensive skilled workers. It eliminates production delays caused by rejections experienced with the laced cable type of harness and provides unique flexibility for replacement or repair of inter-chassis wiring. The removable channel covers provide easy access to wiring and the push-on contactors provide unique flexibility for replacement or repair. Furthermore, the entire harness can be shipped intact for quick simple installation in the field even by non-technical personnel. It can be seen that, even though the lengths of the individual wires may not be exactly correct, the appearance from the outside is very neat, all slack being retained within the channels and cross-pieces. It should be noted that the present construction lends itself to the use of the encapsulating technique for embedding the wires within the conduit in epoxy, or the like, to reduce the effects of moisture and fungus.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Electrical apparatus, comprising
(a) at least one elongated member of hollow conformation, and
(b) a plurality of parallel, spaced cross-pieces connected to and extending from the elongated member, each cross-piece consisting of a conduit having an access door and of clamping means, the wires passing over the clamping means for egress laterally from the conduit while locking the wires in preselected positions.

2. Electrical apparatus as recited in claim 1, wherein the said means includes elastomer elements embracing each wire without damaging it.

3. Electrical apparatus as recited in claim 1, wherein each access door bears indicia indicating the connections of wires contained in its respective conduit.

4. Electrical apparatus as recited in claim 1, wherein each conduit consists of a plate lying in the general plane of elongated member, a shelf extending at a right angle to the bottom edge of the plate, and the access door extends at an inclined angle between the upper edge of the plate and the outer edge of the shelf.

5. Electrical apparatus as recited in claim 4, wherein the wires are color-coded and the access door carries indicia indicating the position of egress of each wire contained in its respective conduit.

6. Electrical apparatus as recited in claim 4, wherein the access door is fastened to the plate adjacent its upper edge by screw means and wherein the said upper edge of the plate and the upper edge of the door are provided with matching elastomer elements for locking the ends of the wires.

7. Electrical apparatus as recited in claim 6, wherein each elastomer element is in the form of a strip which is bent over the edge on which it is mounted and cemented in place.

8. Electrical apparatus as recited in claim 6, wherein the access door is provided with a strip adjacent its upper edge which extends parallel to the plate, while the remainder of the door lies at a substantial angle to the plate with its lower edge on the upper surface of the shelf.

9. Electrical apparatus as recited in claim 1, wherein said elongated member is of C-shape and is orientated with its open side facing inwardly for communication with the adjacent ends of the conduits.

References Cited

UNITED STATES PATENTS 1,923,893 8/1933 Smith ---------------- 317—99

FOREIGN PATENTS 614,950 2/1961 Canada.
1,352,504 1/1964 France.

ROBERT K. SCHAEFER, *Primary Examiner.*

M. GINSBURG, *Assistant Examiner.*